Jan. 21, 1941.  A. L. PARKER  2,229,587
FLEXIBLE COUPLING FOR TUBES
Filed June 9, 1937
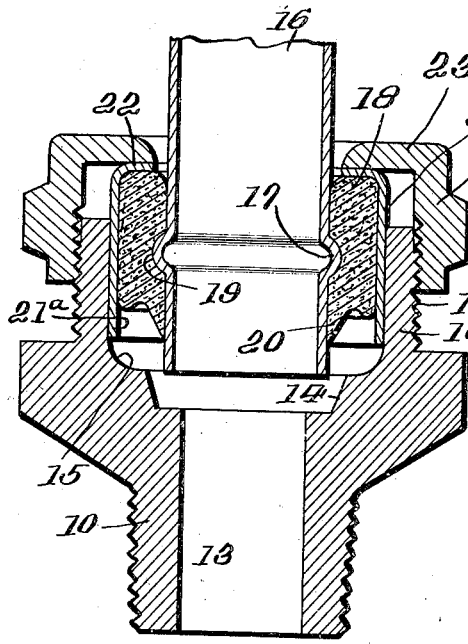
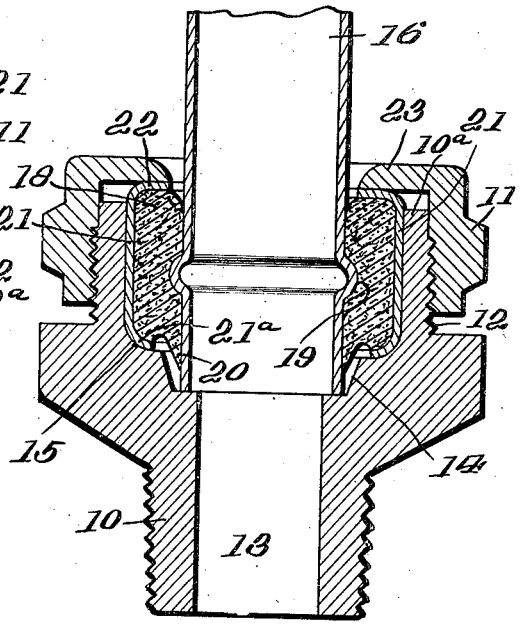
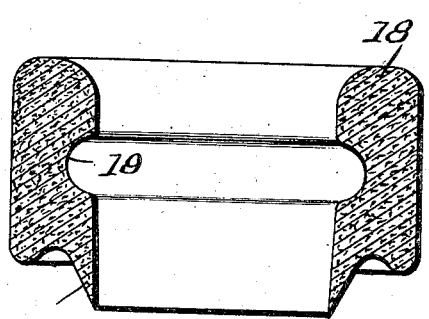
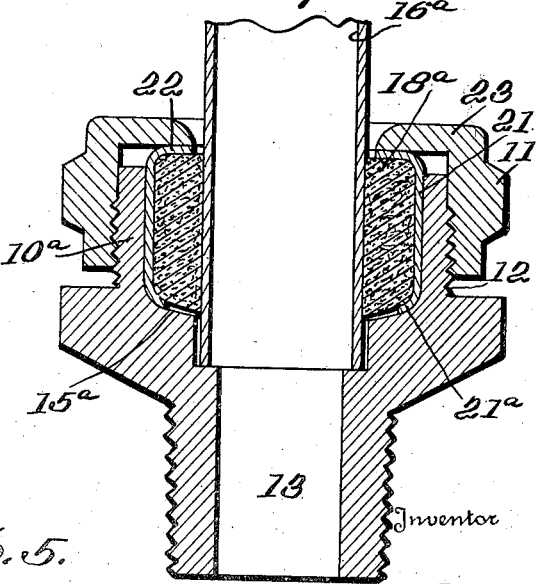
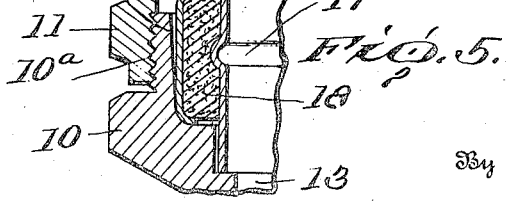
Inventor
Arthur L. Parker
By Mason & Porter
Attorneys Patented Jan. 21, 1941

2,229,587

UNITED STATES PATENT OFFICE 2,229,587

FLEXIBLE COUPLING FOR TUBES

Arthur L. Parker, Cleveland, Ohio

Application June 9, 1937, Serial No. 147,318

4 Claims. (Cl. 285—90)

The present invention relates to new and useful improvements in tube couplings and more particularly to improvements in a flexible coupling for flexibly clamping the end of a metal tube.

An object of the invention is to provide a flexible tube coupling wherein a part of the coupling is deformed when the coupling members are tightened relative to one another, and whereby in the deformation of that part of the coupling serves to tightly press an elastic packing member against the tube.

A further object of the invention is to provide a flexible tube coupling of the above type, wherein one of the coupling members is shaped to provide a surface against which one end of a metal sleeve abuts when the coupling members are tightened relative to one another so that this end of the metal sleeve is forced inwardly toward the tube to tightly press an elastic packing member against the tube.

A further object of the invention is to provide a flexible tube coupling of the above type, wherein the tube is provided with an outward bead which is adapted to extend into the elastic packing member.

A still further object of the invention is to provide a flexible tube coupling of the above type wherein the elastic packing member is preformed and provided with a recess to receive the outward bead on the tube.

A still further object of the invention is to provide a flexible tube coupling of the above type, wherein the elastic packing member is provided with an annular skirt portion which snugly fits around the tube and serves to maintain a liquid tight seal.

The above and other objects of the invention will in part be obvious and will be hereinafter more fully pointed out.

In the accompanying drawing:

Fig. 1 is a longitudinal view in section, showing the preferred form of the coupling with the tube inserted within the elastic packing member before the coupling members have been tightened relative to one another;

Fig. 2 is a similar view in section, showing the flexible coupling after the coupling members have been tightened relative to one another.

Fig. 3 is an enlarged view in section, showing the preformed elastic packing member;

Fig. 4 is a longitudinal view in section, showing a modified form of the flexible coupling with the coupling members tightened relative to one another.

Fig. 5 is a fragmentary section of a further modification.

The invention relates generally to a tube or pipe coupling for flexibly securing a tube or pipe so as to provide a connection which is liquid tight and which will permit the tube or pipe to shift relative to the axis of the coupling members, thus affording a connection which prevents loosening of the coupling parts when the pipe line is subjected to vibration. The coupling includes a pair of coupling members threadedly engaging one another and an elastic packing member which surrounds and directly contacts with the tube. The elastic packing member is surrounded by a metal sleeve which is turned over the top of the elastic coupling member and against which one of the coupling members abuts. The other coupling member is provided with a surface against which the opposite end of the metal sleeve contacts when the coupling members are tightened relative to one another. When the coupling members are tightened, the surface against which one end of the metal sleeve abuts, serves to deform this end of the sleeve inwardly toward the tube. This deformation of the metal sleeve serves to compress the elastic packing member by inward radial movement thereof and to tightly press the same against the tube whereby to provide a firm clamping action and a liquid tight seal.

Referring more in detail to the accompanying drawing, and particularly to Figs. 1, 2 and 3, the coupling includes a male coupling member 10 and a female coupling member 11 which threadedly engage one another, as at 12. The male coupling member 10 is provided with a central bore 13 and an annular recess 14. The inner wall portion 15 of the male coupling member 10 is curved inwardly from the upstanding threaded portion 10a thereof to the wall of the recess 14. The tube 16 is provided with an outwardly extending annular bead 17 near the end thereof. The outwardly extending bead is embedded in an elastic packing member and serves to resist any tendency of the tube to pull out of the gasket. Furthermore, the outward beading of the tube permits a free flow of fluid therethrough.

As shown in Fig. 3, the elastic packing member 18 is preformed and shaped to include a recess 19 extending around the inside thereof. The elastic packing member 18 is also provided with a depending skirt portion 20, the inner wall of which is slightly inclined toward the axis thereof. This elastic packing member is preferably made of a rubber-like composition which is resistant to hydrocarbon and fuel oils.

As shown in Fig. 1, the elastic packing member 18 is placed around the tube 16 with the outward bead 17 on the tube extending into the recess 19 in the packing member. The depending skirt portion 20 of the packing member tightly grips the tube below the bead thereon. A relatively hard metal sleeve 21, which may be made of stainless steel or the like, surrounds the elastic packing member 18 and is provided at the upper end thereof with an inturned portion 22 which overlies and abuts against the upper edge of the packing member 18. The female coupling member is provided with an inwardly extending shoulder portion 23 which overlies the inturned portion 22 of the metal sleeve 21. There is thus provided, between the shoulder 23 on the female coupling member and the inturned portion 22 on the metal sleeve, a relatively hard surface of contact, so that when the coupling members are tightened relative to one another, the female coupling member 11 will turn on the inturned portion 22 of the metal sleeve. Thus, the elastic packing member and the tube will not be twisted or otherwise deformed during tightening of the coupling.

The position of the tube 16 and the coupling members before the coupling members are tightened relative to one another is shown in Fig. 1. When the coupling members are tightened relative to one another, the metal sleeve 21 and the elastic packing member 18 will be axially moved toward the male coupling member and the tube 16 will be carried therewith. During the relative axial movement of the coupling members 10, 11, toward one another, the free end 21a of the sleeve 21 will be forced by the curved surface 15 on the male coupling member inwardly toward the tube 16. This deformation or inward bending of the free end 21a of the sleeve 21 will tightly press the elastic packing member 18 against the tube. When the coupling members are finally tightened, the parts will assume the positions shown in Fig. 2.

A space is left between the inner end of the shoulder 23 on the female coupling member 11 and the tube 16. Similarly, a space is left between the inturned portion 22 of the sleeve 21 and the tube 16. This space permits the tube to assume different angular positions in respect to the axis of the coupling so that vibration in the fluid line can be absorbed without undue strain on the metal tube or on the coupling. Any fluid leaking by the end of the tube 16 will pass into the annular recess 14 in the male coupling member and serve to further press the depending skirt portion 20 on the elastic coupling member 18 against the tube 16, thus providing a liquid tight joint. Any pull on the tube will tend to curve the end of the skirt portion 20 tightly against the tube so as to insure a liquid tight seal.

In Fig. 4, there is shown a slightly modified form of tube coupling. In this form of the invention, the metal tube 16a is not provided with a bead but is directly engaged by an elastic packing member 18a which is surrounded by a similar metal sleeve 21, the inturned portion 22 of which abuts against the inwardly extending shoulder 23 on the female coupling member 11. When the coupling members are tightened relative to one another, the free end 21a of the sleeve 21 will be forced inwardly by the curved surface 15a on the male coupling member so as to tightly press the elastic packing member against the tube 16a.

In Fig. 5 there is shown a still further modification wherein the inner face of the threaded portion 10a of the male coupling member 10 is tapered, as at 10b, so that the maximum internal diameter is at the free end thereof. There is some radial expansion of the sleeve 21 and packing member 18 when the coupling members are tightened relative to one another, so that it is often difficult to withdraw the tube from the male coupling member. Since the male coupling member is fastened to a permanent structure, it is desirable that it be not disturbed. The tapered portion 10b makes it possible to more easily withdraw the tube, packing member 18 and sleeve 21, when it is so desired, without disturbing the male coupling member.

From the foregoing description, it will be readily seen that a highly efficient and economical flexible tube coupling is herewith provided. The metal tube is held by an elastic packing member which is tightly pressed against the tube so as to firmly grip the same, and, at the same time, to provide a liquid-tight seal. The metal tube is thus permitted to vibrate slightly due to vibration in the fluid line without causing undue strain on the tube itself or on the coupling parts.

It is to be clearly understood that various changes in the details of construction and arrangement of parts may be made without departing from the scope of the invention as set forth in the appended claims.

Having thus described the invention, what I claim as new and desire to secure by Letters Patent is:

1. A flexible coupling for tubes comprising a pair of relatively movable coupling members, a packing member surrounding and serving to support the tube and disposed between said coupling members, and a clamping sleeve surrounding said packing member and having a lateral shoulder portion at one end abutting against one of said coupling members, the opposite end of said sleeve being engageable with the other of said coupling members and adapted to be deformed inwardly upon relative movement of said coupling members toward one another whereby to tightly press the packing member against the tube.

2. A flexible coupling for tubes comprising a pair of relatively movable coupling members threadedly engaging one another, a packing member surrounding the tube and disposed within the threadedly enegaging portion of said coupling members, and a clamping sleeve surrounding said packing member and abutting against said coupling members and adapted to be deformed inwardly upon relative movement of said coupling members toward one another whereby to tightly press the packing member against the tube, and the coupling member immediately surrounding said sleeve being tapered toward the free end thereof whereby to facilitate removal of the tube, packing member and sleeve when the coupling members are disconnected.

3. A flexible coupling for tubes having an outwardly projecting integrally formed bead spaced away from the end of the tube, comprising a deformable gripping member surrounding the tube in the region of said bead, coupling members having threaded engagement with each other for housing the end of the tube and the deformable member, a metal sleeve surrounding said deformable member and having a lateral shoulder at one end abutting against one of the coupling members, the opposite end of said sleeve being engageable with the other of said coupling members and adapted to be deformed inwardly upon relative movement of the coupling members toward one another to tightly press the packing against the tube in the region of the bead and at each side thereof.

4. A flexible coupling for tubes comprising a pair of relatively movable coupling members, a packing member surrounding and serving to support the tube and disposed between said coupling members, and a clamping sleeve surrounding said packing member and having a lateral shoulder portion at one end abutting against one of said coupling members, the opposite end of said sleeve being engageable with the other of said coupling members and adapted to be deformed inwardly upon relative movement of said coupling members toward one another whereby to tightly press the packing member against the tube, said packing member at the end thereof adjacent the end of the tube having a projecting portion, the inner face of which is shaped to conform to and contact with the tube, and the outer face of which is shaped so as to be spaced away from the coupling members whereby said outer face is exposed to the fluid pressure on the line passing into the coupling members and bearing thereagainst, for holding said projecting portion in fluidtight contact with the tube.

ARTHUR L. PARKER.